UNITED STATES PATENT OFFICE.

EMIL FISCHER, OF BERLIN, GERMANY, ASSIGNOR TO SYNTHETIC PATENTS CO., INC., OF NEW YORK, N. Y., A CORPORATION OF NEW YORK.

SALTS OF HIGH MOLECULAR FATTY ACIDS CONTAINING ARSENIC AND A HALOGEN.

1,101,733.     Specification of Letters Patent.     Patented June 30, 1914.

No Drawing.     Application filed August 12, 1913. Serial No. 784,379.

*To all whom it may concern:*

Be it known that I, EMIL FISCHER, doctor of philosophy, professor of chemistry, citizen of the German Empire, residing at Berlin, Germany, have invented new and useful Improvements in Salts of High Molecular Fatty Acids Containing Arsenic and a Halogen, of which the following is a specification.

This invention relates to salts of high molecular fatty acids containing arsenic; and it comprises such salts as the calcium, strontium, and iron salts of high molecular fatty acids, particularly of the unsaturated higher fatty acids such as stearolic and behenolic, containing both arsenic and a halogen such as chlorin or bromin; more specifically it comprises the calcium, strontium, and iron salts of the chlorarsenobehenolic acid, all as more fully hereinafter set forth and claimed.

The present application is in part a continuation of my prior application, Serial No. 717247, filed August 27, 1912, in which I have claimed generically the high molecular fatty acid compounds containing arsenic and halogen.

The novel products claimed in the present application can be prepared from the halogen arseno fatty acids such as chlorarsenobehenolic acid by treatment with the metal salts in alcoholic solution. These novel products are insoluble or difficultly soluble in water, are decomposed by mineral acids setting free the halogenarseno fatty acids and retaining the valuable therapeutic properties of the free acids.

The following specific examples further illustrate the novel products of the present invention and their method of preparation:

*Example 1—Strontium salt of chlorarsenobehenolic acid.*—100 parts of crude free chlorarsenobehenolic acid are dissolved in 1600 parts of methylic alcohol, and the solution is carefully diluted with water until a turbidlity sets in which just remains permanent. The liquid is allowed to stand for about one day and then the clear solution poured off from the dark colored precipitate. The thus obtained light red solution of the free chlorarsenobehenolic acid is allowed to run into a solution of 40 parts of chlorid of strontium in 200 parts of methylic alcohol to which 20 parts of alcoholic ammonia containing 17 per cent. of ammonia are added. This addition is made at about 0 to 5° while constantly stirring. In this way the strontium salt of chlorarsenobehenolic acid is precipitated as an almost colorless thick paste. After standing for a short time it is filtered off, washed with alcohol, water, acetone and ether and dried by exposure to air. It forms an almost colorless powder, almost insoluble in water and organic solvents and decomposed by dilute mineral acids, forming free chlorarsenobehenolic acid. The strontium salt contains about 13.5 per cent. of arsenic and 6.3 per cent. of chlorin.

*Example 2—Calcium salt of chlorarsenobehenolic acid.*—A solution of 60 parts of chlorarsenobehenolic acid in 200 parts of absolute alcohol is added to a solution of 50 parts of crystallized chlorid of calcium in 2000 parts of absolute alcohol, to which sufficient ammonia is added to make a 2½ normal solution. The addition is made at a temperature of —10° while constantly stirring. The salt at first precipitates in a somewhat pasty form, but after standing for about 2 hours it can be filtered off. It is then stirred into dilute 50 per cent. alcohol, filtered off, stirred with water, filtered, washed with alcohol and dried in the air. The calcium salt contains about 11 per cent. of arsenic acid and 5.10 per cent. of chlorin.

*Example 3—Iron salt of chlorarsenobehenolic acid.*—60 parts of chlorarsenobehenolic acid are dissolved in 400 parts of alcohol and while stirring added to a mixture of 1200 parts of basic ferric oxychlorid solution (the liquor ferri oxychlorati dialysati of the *German Pharmacopœia*, 5th edition) and 1200 parts of alcohol. In this way a red-brown precipitate is obtained which is the basic iron salt of chlorarsenobehenolic acid. The precipitate is filtered off, repeatedly stirred with alcohol and filtered. It is first dried by exposure to air and later at 60°. The product forms a brown powder, insoluble in water and alcohol which is decomposed by mineral acid. It contains about 33.33 per cent. of iron and 5.37 per cent. of arsenic. The quantities of chlorarsenobehenolic acid and of iron solution may be varied and in this way products may be obtained which show a different ratio of iron and arsenic.

Instead of the above liquid iron preparation, basic acetate of iron, or chlorid of iron, or other iron salts may be employed.

I claim:—

1. The herein described new salts of high molecular fatty acids containing arsenic and halogen, which salts are substantially insoluble in water, decomposed by mineral acids into free halogenarseno fatty acid, and which retain the valuable therapeutic properties of the free acid, substantially as described.

2. The herein described new salts of high molecular fatty acids containing arsenic and chlorin, which salts are substantially insoluble in water, decomposed by mineral acids into the free chlorarseno fatty acid, and which retain the valuable therapeutic properties of the free acid, substantially as described.

3. The herein described new salts of chlorarsenobehenolic acid, which salts are substantially insoluble in water, decomposed by mineral acids into the free chlorarsenobehenolic acid, and which retain the valuable therapeutic properties of the free acid, substantially as described.

4. The herein described new salts of divalent metals of the calcium groups of high molecular fatty acids containing arsenic and halogen, which salts are substantially insoluble in water, decomposed by mineral acids into free halogenarseno fatty acid, and which retain the valuable therapeutic properties of the free acid, substantially as described.

5. The herein described new salts of divalent metals of the calcium groups of high molecular fatty acids containing arsenic and chlorin, which salts are substantially insoluble in water, decomposed by mineral acids into the free chlorarseno fatty acid, and which retain the valuable therapeutic properties of the free acid, substantially as described.

6. The herein described new salts of divalent metals of the calcium group of behenolic acid containing arsenic and halogen, which salts are substantially insoluble in water, decomposed by mineral acids into the free halogenarsenobehenolic acid, and which retain the valuable therapeutic properties of the free acid, substantially as described.

7. The herein described new salts of divalent metals of the calcium group of behenolic acid containing arsenic and chlorin, which salts are substantially insoluble in water, decomposed by mineral acids into the free chlorarsenobehenolic acid, and which retain the valuable therapeutic properties of the free acid, substantially as described.

8. The herein described new strontium salt of chlorarsenobehenolic acid, which is substantially insoluble in water and organic solvents, decomposed by dilute mineral acids setting free the chlorarsenobehenolic acid, and retaining the valuable therapeutic properties of the free acid, substantially as described.

In testimony whereof I have hereunto set my hand in the presence of two subscribing witnesses.

EMIL FISCHER.

Witnesses:
HENRY HASPER,
ARTHUR SCHROEDER.